Aug. 6, 1963   P. P. NEWCOMB   3,099,909
NOZZLE CONSTRUCTION
Filed May 21, 1959
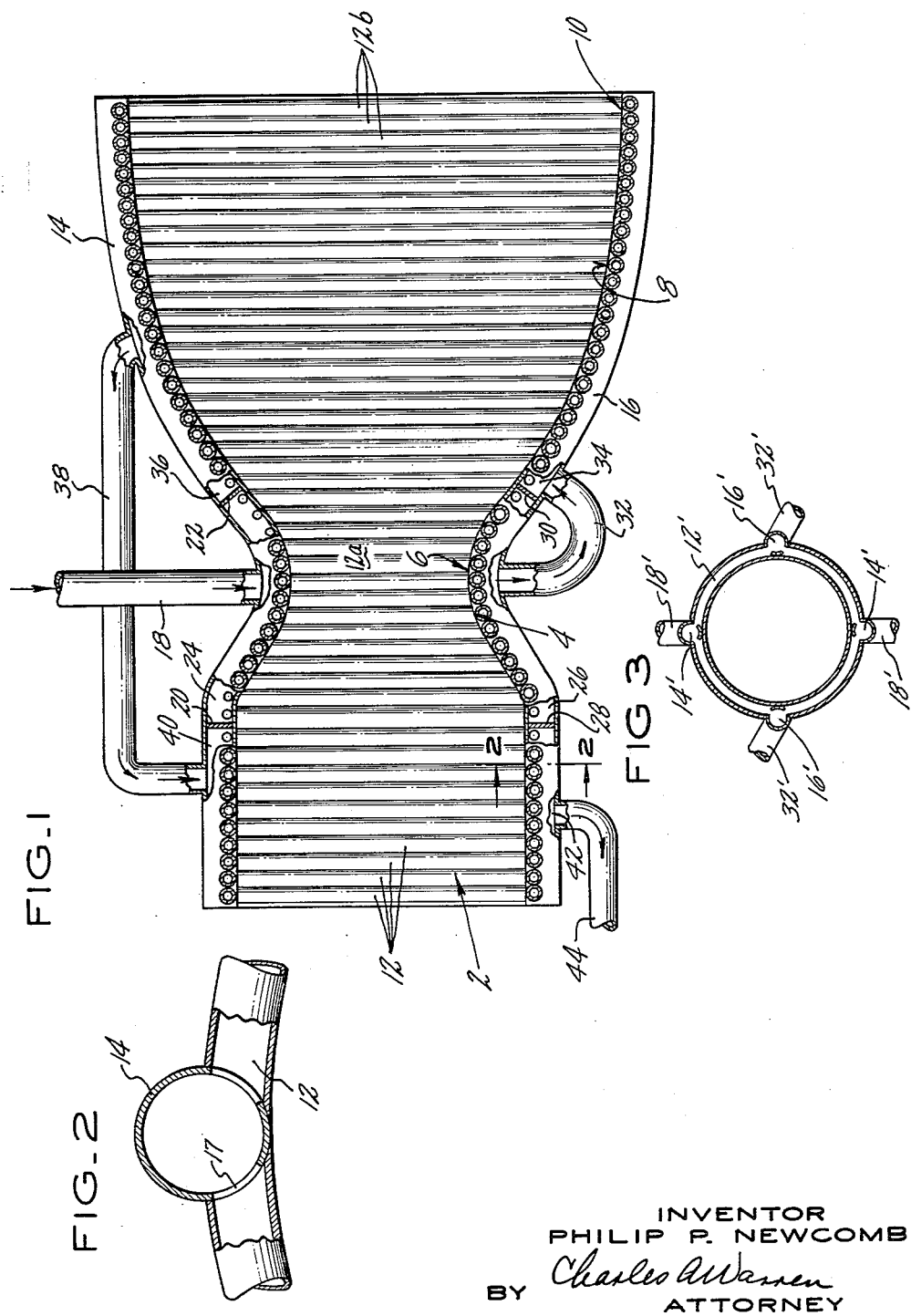
INVENTOR
PHILIP P. NEWCOMB
BY Charles A. Warren
ATTORNEY

United States Patent Office 3,099,909
Patented Aug. 6, 1963

3,099,909
NOZZLE CONSTRUCTION
Philip P. Newcomb, Manchester, Conn., assignor to United Aircraft Corporation, East Hartford, Conn., a corporation of Delaware
Filed May 21, 1959, Ser. No. 814,902
7 Claims. (Cl. 60—35.6)

This invention relates to a rocket and particularly to a nozzle having a cooled wall.

One feature of the invention is a nozzle made up of circumferentially extending tubes forming the nozzle wall and with a manifold arranged for directing coolant through the tubes. Another feature is the manifolding of the tubes such that the throat portion of the nozzle is cooled first before the remainder of the nozzle.

One feature of the invention is the use of axially extending tubes for additionally supporting the circumferentially extending tubes and also as the manifold by which the tubes are connected together. Another feature is the selective blocking of these tubes in order that the portions of the nozzle may be cooled in the desired sequence.

Other features and advantages will be apparent from the specification and claims, and from the accompanying drawing which illustrates an embodiment of the invention.

FIG. 1 is a longitudinal sectional view through the nozzle.

FIG. 2 is a sectional view substantially along the line 2—2 of FIG. 1 showing the interconnection between the manifold and tubes.

FIG. 3 is a transverse sectional view showing a modification.

The nozzle which is adapted for use on a rocket has a substantially cylindrical inlet portion 2, which may be a part of the cooled wall of the rocket combustion chamber, a convergent portion 4, a throat 6 and a divergent portion 8 terminating in the open discharge end 10 of the nozzle. The nozzle wall is made up of a large number of tubes 12, each arranged in the form of a ring. The rings vary in diameter in order to form the appropriate diameter for the nozzle wall. Thus the tubes 12a at the throat are formed into rings smaller in diameter than the tubes 12 at the inlet or the tubes 12b adjacent to the discharge end 10. All of the rings are in side-to-side axial contact, as shown, and are brazed together to form a continuous wall.

The tube rings are additionally supported by longitudinally extending tubes or pipes 14 and 16, there being two in the arrangement shown, located at diametrically opposite sides of the nozzle and extending the entire length of the nozzle construction. These pipes intersect the tubes 12, the latter being cut away to receive these tubes, as shown in FIG. 2, and the pipes 16 having openings 17 therein to communicate with each of the tubes 12. In this way a cooling fluid introduced into one of these pipes will flow through the tubes 12 circumferentially in opposite directions and into the other pipe 16.

It is desirable to cool the throat portion of the nozzle first while the coolant is at the lowest temperature and, accordingly, coolant is admitted to the throat portion of the pipe 14 as by an inlet duct 18. This coolant entering the pipe 14 is confined to the throat portion by barriers or partitions 20 and 22, the later located approximately at the downstream end of the throat portion of the nozzle and the barrier 20 being located somewhat upstream of the nozzle. Thus, the coolant entering the chamber 24 formed by the pipes 14 between the barriers flows through the throat forming tubes 12a into a corresponding chamber 26 in the pipe 16, this chamber being defined by the barriers 28 and 30 spaced apart in the same manner as the partitions 20 and 22.

The chamber 26 is connected by a duct 32 to a chamber 34 formed in the pipe 16 downstream of the barrier 30. The coolant flows from the chamber 34 through the tubes 12 that communicate therewith back to a chamber 36 in the pipe 14 downstream of the barrier 22.

From the chamber 36 a duct 38 delivers a coolant to a chamber 40 in the pipe 14 upstream of the barrier 20. From the chamber 40 the coolant flows through the wall forming tubes to a chamber 42 in the pipe 16 upstream of the barrier 28. The coolant is then delivered through a duct 44 to its next point of utilization which may be a fuel nozzle, not shown, for the rocket in those cases where the rocket fuel is used as the coolant.

Referring now to FIG. 3, it may be desirable to have more than the two diametrically opposite supporting pipes 14 and 16. In this figure the tubes 12' are reenforced by a pair of tubes 14' at diametrically opposite positions and another pair of tubes 16' located at 90° to the pipes 14'. With this arrangement, coolant is supplied through conduits 18' to each of the pipes 14' and flows out of the pipes 16' through conduits 32' to the downstream portions, not shown, of the pipes 16'. The pipes 14' and 16' will have barriers therein similar to those of FIG. 1.

It is to be understood that the invention is not limited to the specific embodiment herein illustrated and described, but may be used in other ways without departure from its spirit as defined by the following claims.

I claim:

1. A nozzle construction, including a series of circumferentially extending rings each consisting of a hollow tube, the rings varying in diameter and being stacked in sidewise engagement to form the nozzle, a plurality of diametrically spaced longitudinally extending pipes secured externally of the tubes, each pipe forming a manifold intersecting said tubes and communicating with the hollow interior of the tubes for the flow of coolant therethrough, partitions in said manifold forming chambers, and fluid conductive means interconnecting said chambers for the distribution of coolant through said tubes.

2. A nozzle construction as in claim 1 in which the nozzle has a throat portion and a discharge portion, and in which the partitions form throat manifold chambers and discharge manifold chambers, and means for directing the coolant between one of said throat manifold chambers and one of said discharge manifold chambers.

3. A nozzle construction as in claim 1 in which the nozzle has a throat portion and a discharge portion, and in which the manifolds are partitioned to form throat manifold chambers and discharge manifold chambers, means for directing the coolant from one of said manifold chambers to one of the other of said manifold chambers, and in which a coolant inlet is connected to one of the throat manifold chambers.

4. A nozzle construction as in claim 1 in which the nozzle has a throat portion and a discharge portion and in which the manifolds are partitioned to form throat manifold chambers and discharge manifold chambers, means for directing the coolant from one of said manifold chambers to one of the other of said manifold chambers, and in which a coolant inlet is connected to one of the throat manifold chambers, and in which another throat manifold chamber is connected to one of the discharge manifold chambers.

5. A nozzle construction including circumferentially extending tube elements arranged in convolutions substantially concentric to the axis of the nozzle with successive convolutions in contact with one another axially of the nozzle, successive convolutions varying in diameter to form the desired contour for the nozzle including a reduced throat portion and larger portions, at least two equally circumferentially spaced longitudinally extending pipes secured to and connecting said tube elements and communicating with the hollow interior of the tubes for a flow of coolant from the pipes into said tubes sequentially through said throat portion and said larger portions, barriers in said pipes defining throat chambers and end chambers, and fluid conductive means interconnecting said chambers for the distribution of coolant to the tubes.

6. A nozzle construction as in claim 5 in which coolant is delivered to the throat portion of one of said pipes.

7. A nozzle construction as in claim 5 including means for introducing coolant to the throat chamber of one of said pipes, and other means delivering coolant from the throat chamber of the other of said pipes to one of the end chambers.

References Cited in the file of this patent

UNITED STATES PATENTS

| | | |
|---|---|---|
| 2,395,403 | Goddard | Feb. 26, 1946 |
| 2,473,356 | Birmann | June 14, 1949 |
| 2,844,271 | Shelton | July 22, 1958 |
| 2,933,888 | Africano et al. | Apr. 26, 1960 |
| 2,975,590 | Vonder Esch | Mar. 21, 1961 |
| 2,979,293 | Mount | Apr. 11, 1961 |

FOREIGN PATENTS

| | | |
|---|---|---|
| 1,100,454 | France | Apr. 6, 1955 |